E. T. WILLIAMS.
ICE MAKING AND HARVESTING APPARATUS.
APPLICATION FILED JULY 1, 1910.
1,051,298.
Patented Jan. 21, 1913.
4 SHEETS—SHEET 1.
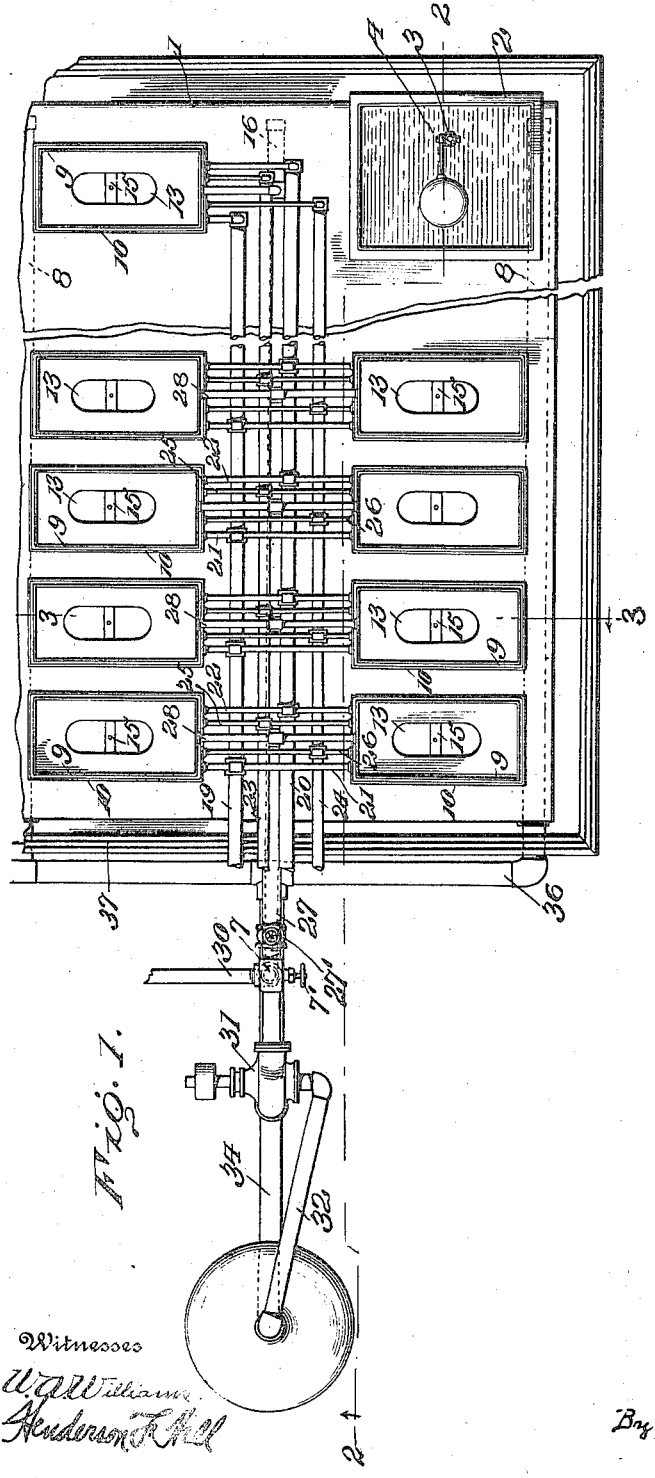

E. T. WILLIAMS.
ICE MAKING AND HARVESTING APPARATUS.
APPLICATION FILED JULY 1, 1910.
1,051,298.
Patented Jan. 21, 1913.
4 SHEETS—SHEET 2.
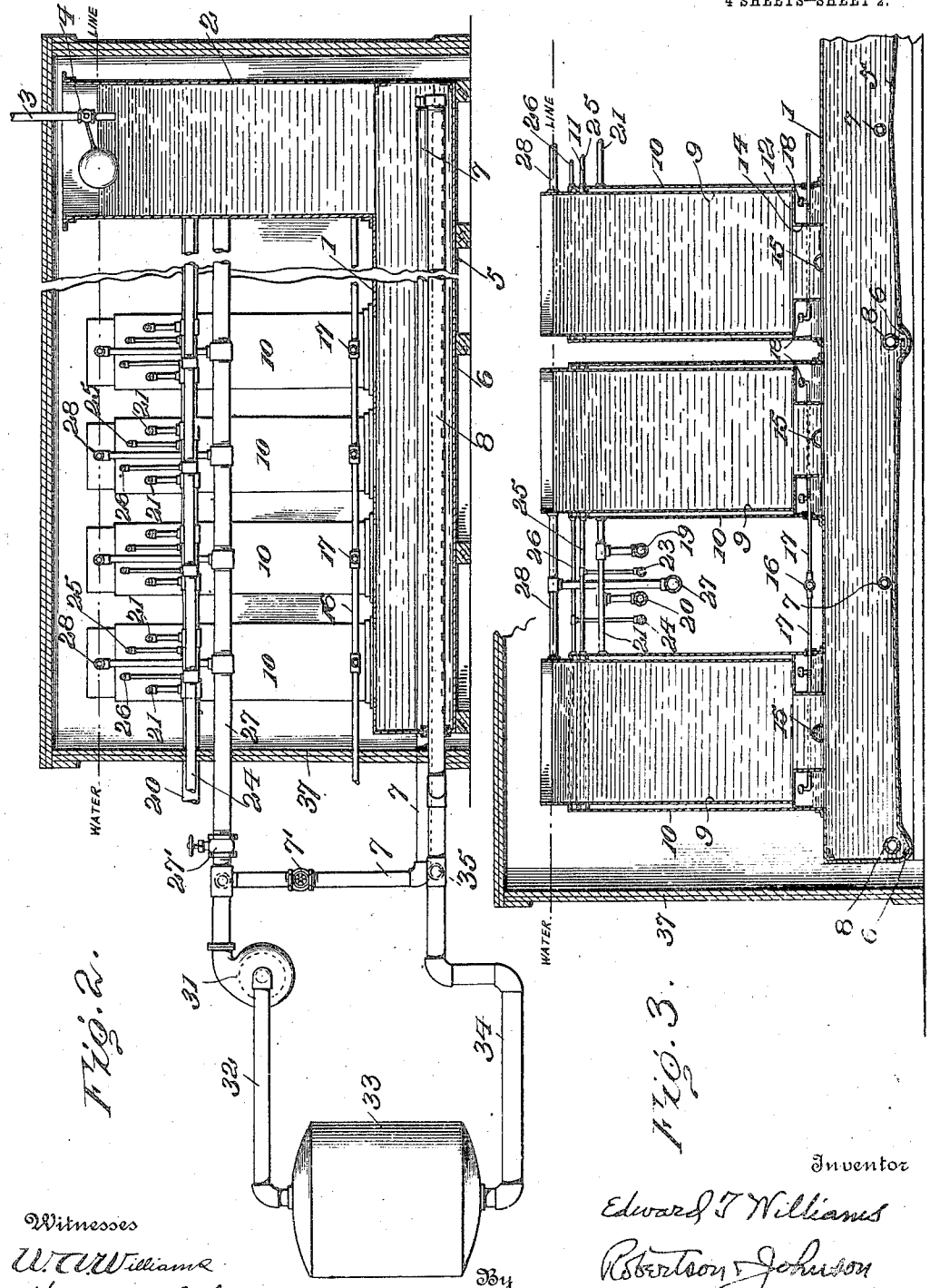
Witnesses
W. T. Williams
Henderson F. Hill
Inventor
Edward T. Williams
By Robertson & Johnson
Attorneys

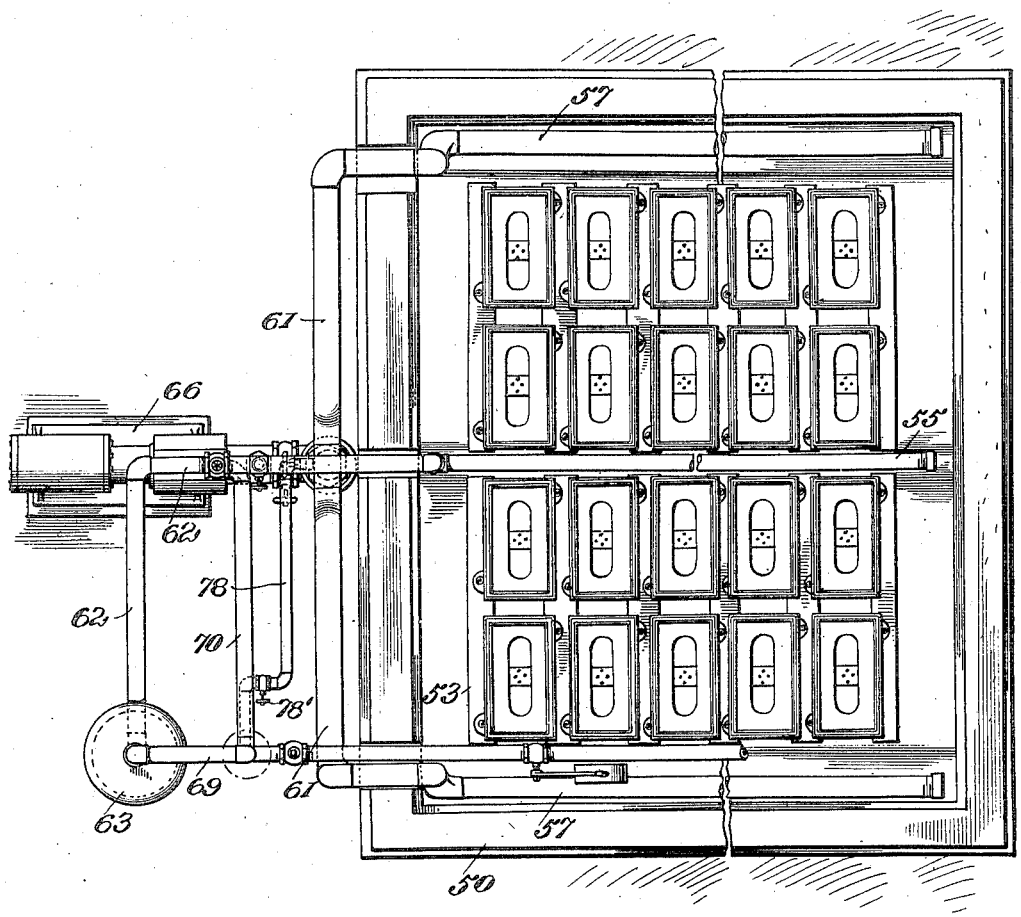

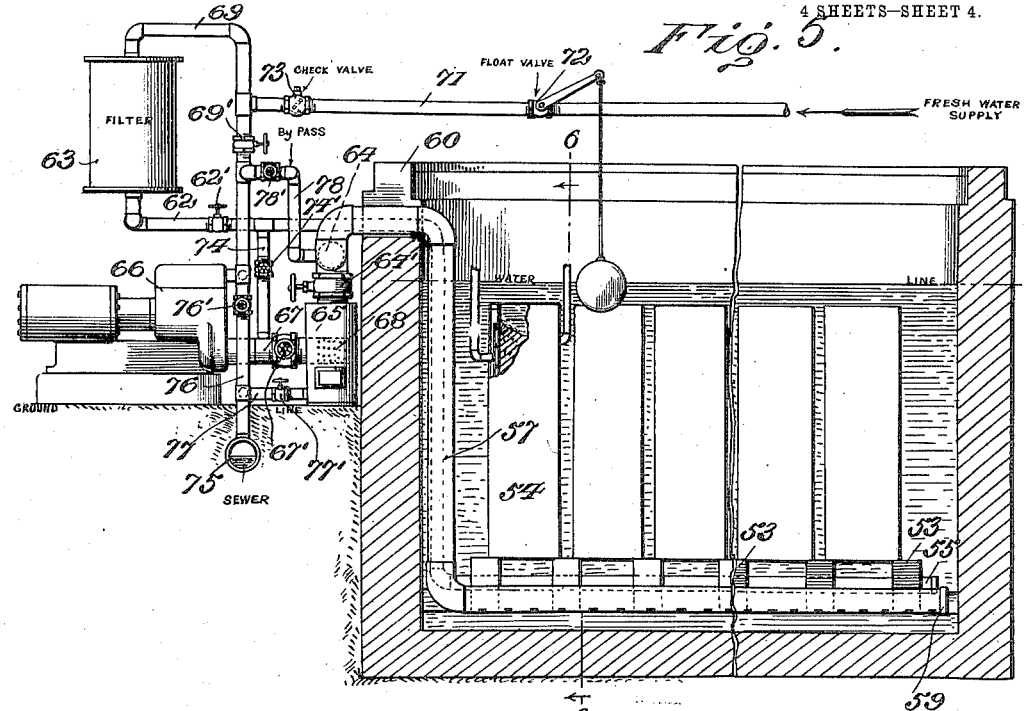
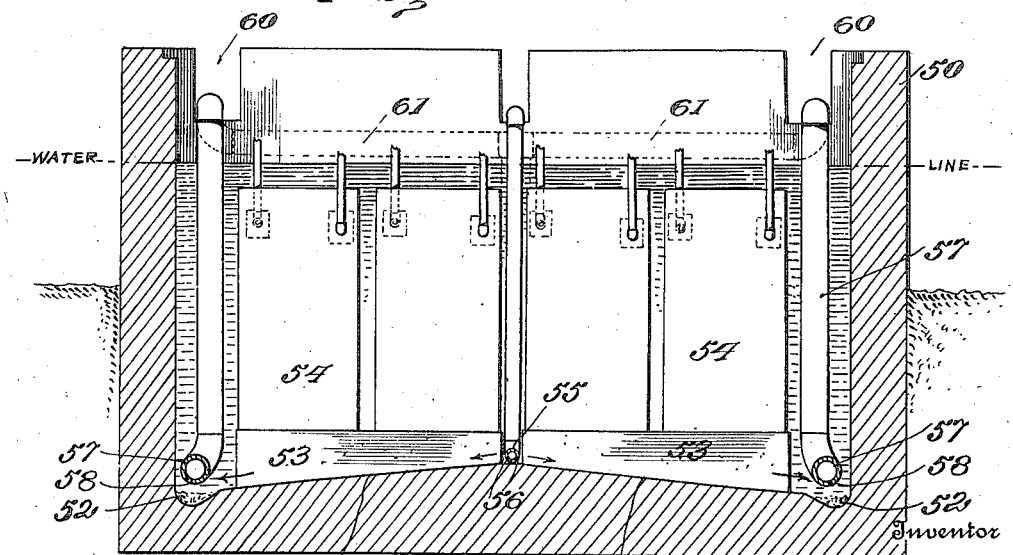

ated and described herein, and in the
UNITED STATES PATENT OFFICE.

EDWARD T. WILLIAMS, OF BROOKLYN, NEW YORK.

ICE MAKING AND HARVESTING APPARATUS.

1,051,298.  Specification of Letters Patent.  Patented Jan. 21, 1913.

Application filed July 1, 1910. Serial No. 569,968.

*To all whom it may concern:*

Be it known that I, EDWARD T. WILLIAMS, a citizen of the United States, and a resident of Brooklyn, in the county of Kings and State of New York, have invented new and useful Improvements in Ice Making and Harvesting Apparatus, of which the following is a specification.

My invention relates to ice making and harvesting apparatus and, though having various distinctive and broadly novel features of its own, may be regarded as a different and improved embodiment of the broad invention set forth in my co-pending application, Ser. No. 554,943, filed April 12, 1910. It will be understood also that the auxiliary thawing and other devices set forth in my co-pending application, Ser. No. 566,660, filed June 13, 1910, may for the most part be employed in the system about to be described. Both in the system illustrated in said application Ser. No. 554,943, and in the present system, a plurality of molds are employed so located with reference to a common water supply as to be automatically and immediately filled to the desired level on the removal of an ice block, and means are provided for freezing and thawing the contents of the molds. Any of the mold constructions or any of the modes of connection specified in the said application or indeed any other suitable mold structures or modes of connection may be employed in this system. The primary difference between the systems lies in the fact that the molds in the present system are not submerged or located within a water tank; but, while in communication with a common water supply, are outside the same and, while filled with water to the desired level, are not surrounded by it, their exteriors being readily accessible, the piping which serves the molds being also outside the common water supply. The illustrated construction whereby this is accomplished comprises a shallow water tank having a closed top on which the molds, open at the top, are located with their interiors in communication with the tank at their bottoms, and, a stand pipe or reservoir in communication with the tank to keep the water at the desired level in the molds. In a broader sense the entire tank and stand pipe constitute a reservoir. This arrangement is simple and inexpensive, enables the freezing and thawing piping and the air lines to be located outside the tank, renders insulation less important, and is for various other reasons desirable.

My invention also relates to systems of drainage for the molds and for the tank.

My invention therefore consists in the subject matter, embodiments of which are illustrated and described herein, and in the matters set forth in the appended claims.

Referring to the drawings: Figure 1 is a plan view of a part of the system. Fig. 2 is an elevation and section on the line 2—2, Fig. 1. Fig. 3 is a section on the line 3—3, Fig. 1. Fig. 4 is a plan of the drainage system applied to a deep tank with molds therein. Fig. 5 is an elevation and section corresponding to Fig. 4, and Fig. 6 is a section on the line 6—6, Fig. 5.

Referring particularly to Figs. 1, 2 and 3: the common water supply consists of a shallow tank, to the top 1 of which the molds are secured by water tight connections suitably being bolted thereto. This tank has an extension forming a reservoir or stand pipe 2 in free communication therewith to maintain the water level in the molds and to refill them automatically and immediately. The stand pipe may of course be of any suitable capacity. It is fed by the supply pipe 3 controlled by a float valve 4. To promote the ready removal of sediment composed of heavy impurities thrown out as the water crystallizes in freezing, I prefer to make the bottom 5 of the tank slant from an intermediate portion, which may be a center line, to gutters 6 on opposite sides of it. Along the intermediate portion I locate a flushing water pipe 7 and in the gutters the suction pipes 8, these being part of a circulatory system hereinafter described in which the normal return is to the tops of the molds, but which makes possible occasional flushing of the tank bottom. It will be understood that I may employ one set of said pipes, or several where the size of the tank requires it, the bottom being sloped accordingly. The flushing pipe need not be on a central line, therefore, though this is the simplest and ordinarily the most effective arrangement. The object is to secure the flushing of the entire bottom and the removal of the sediment. It will be apparent that the bottom might slope from the sides inward and downward and that there might be a flushing pipe at each side and but one suction pipe at the center. To avoid confusion in the drawings a simplified form of the drainage system of which these pipes are parts is shown in Figs. 1, 2 and 3, certain special delivery devices to be hereinafter described being also illustrated therein. This system without the devices referred to is completely and clearly illustrated in Figs. 4, 5 and 6 and will be described hereinafter.

The molds are of suitable construction, preferably as illustrated in my said applications, having inner walls 9 and outer walls 10 constituting freezing and thawing jackets being closed at the top and bottom for this purpose. Auxiliary thawing devices 11 above the freezing zone are indicated. These being fully illustrated and described in my aforesaid application, Ser. No. 566,660, need not be particularized here. The molds have bottoms 12 above the lower end of the outer walls having holes 13 surrounded by depending shells 14 forming with the outer walls water sealed spaces. Perforated bridges 15 as in my said applications are employed. Cross headers 16 are located above the tank between rows of molds, suitable means not shown being employed to deliver to them either cold or warm air under pressure as desired. Connecting pipes 17 run from each header 16 to each mold of the adjacent rows passing through suitable castings riveted and soldered to the molds and therefore water tight into the space between the outer mold wall 10 and the depending shell 14. I may employ two such connecting pipes for each mold each having a delivery nozzle 18 or a single connecting pipe having two delivery nozzles. The operation is as stated in my said applications, air under pressure being delivered to the air spaces below the molds and passing thence into the water in the molds to agitate the same.

The connections for delivering freezing and thawing fluid to the molds may be varied, as may also the air supply connections above described. I find it convenient, however, to run the apparatus in sections of two rows of molds each, as many such sections as desired being employed and each being served independently of all the rest with freezing or thawing fluid as desired. Of course a system of individual mold control such as that described in my aforesaid application, Ser. No. 554,943 might be used. Outside the tank, in the space between adjacent rows of molds are located supply headers 19 and return headers 20 for delivering to the mold jackets and returning therefrom cold or warm brine or other suitable fluid by connecting pipes 21, 22 respectively between the mold jackets and said headers. Similarly located are supply headers 23 and return headers 24, for delivering to the auxiliary thawing devices 11 and returning therefrom warm brine or other thawing fluid by connecting pipes 25 and 26 respectively between the auxiliary thawing devices and said headers. Valves not necessary to be shown are located as desired in the supply headers and connecting pipes.

Systems for circulating fluids, as brine, in ice making apparatus including piping, a pump, etc., are well known in the art, and complete systems for circulating freezing fluid and for circulating thawing fluid, including apparatus for heating the one and for cooling the other, are illustrated and described in my aforesaid co-pending application, Ser. No. 534,943, and nothing would be gained by duplicating such illustration and description in this application.

In connection with the drainage system alluded to, I provide as stated special delivery devices, whereby water is delivered to the individual molds at the top thereof and is drawn downward through the molds, agitating the water therein and carrying down with it the impurities, their weight especially in the case of mineral impurities assisting in this. For this purpose I locate in the space between adjacent rows of molds above the top of the tank water supply headers 27 connected with the interiors of adjacent molds at or about the water line by pipes 28, which open in the sides of the molds and do not interfere with harvesting. The headers 27 are supplied by a main 30, which is connected to the delivery side of a pump 31, the suction side of which is connected by the pipe 32, to the filter 33, the filter being connected by the pipe 34 to the suction main 35, and to the common suction connection 36. By this arrangement water and sediment are drawn from the tank, the sediment filtered out and the water returned by the pump to the tops of the molds passing down through them to the bottom of the tank.

The flushing pipe 7 is connected to the header 27, and valves 27' and 7' are provided to enable water to be diverted to the flushing pipe when desired.

Instead of the higher water level indicated in the drawings, the water level in the system may be maintained at or below the top of the freezing zone. In that event the auxiliary thawing devices 11, the auxiliary thawing supply and return headers 23, 24 and their respective connections 25, 26 would be omitted. The upper part of the mold would also be cut away to a point just above the main freezing jacket. This is of course simpler and cheaper.

The tank and molds may be inclosed by an insulating cabinet 37, which may have a cover 38. The spaces between the molds may be filled with insulating material or each mold may be insulated by jacketing or otherwise. One of the advantages of this system, however, is the fact that there is less need for insulation than if the molds and piping were in the tank, and it will be understood that insulation may be omitted.

As already suggested, in ice making apparatus where tanks are employed the water at the bottom becomes foul by reason of the heavy impurities thrown out by crystallization in the freezing process. To get rid of this sediment I have adopted a drainage system which may be used with a shallow tank as in Figs. 1, 5 and 6 or with a deep tank as illustrated in Figs. 7, 8 and 9. These drainage arrangements may as above suggested be used with the delivery devices above described, or this system may be used in addition to distinct circulating apparatus, neither interfering with the other. In the system shown in Figs. 7, 8 and 9 water and sediment are removed from the bottom of the tank at opposite sides thereof, the water filtered and returned to the bottom of the tank at the center between said sides so as to flush the sediment toward them. The course of the water may be reversed and the operation of the apparatus varied as will appear from the following description: 50 is a concrete tank, whose bottom slopes at 51 in both directions from a central portion to gutters 52 at each side. Parallel piers 53 on said bottom extend from planes near said center line to planes near said gutters. The horizontal tops of these piers support molds 54. Between the opposed inner ends of the piers is located a delivery or return pipe 55 having slots or perforations 56 located at each side of the pipe above the bottom to deliver water to the slopes 51 of the bottom to flush sediment between the piers toward the gutters 52. In these gutters are located large suction pipes 57 having slots or perforations 58 to enable water and sediment to be drawn into the pipes. These pipes have one end closed as by caps 59 and at the other end of the tank extend up the wall and through openings 60, the suction pipes 57 being dropped and having sections 61 extending to the center where they are joined beneath the delivery pipe, an extension 62 of which passes to the filter 63. The suction pipes are thus united into a common pipe 64, which passes down into a sediment trap 65, from which extends to the suction side of the pump 66, a connecting pipe 67 having within the sediment trap a strainer 68.

The top or inlet end of the filter is connected to the delivery side of the pump by the piping 69, 70. The fresh water supply pipe 71 governed by the float valve 72 connects with the pipe 69. The pressure in the supply pipe 71 is normally greater than the pumping pressure, but to prevent delivery of water by the pump to said supply pipe under abnormal circumstances a check valve 73 closable by excess of pumping pressure is located in the pipe 71. Between the pipe 62 and the pipe 67 is a by pass 74. The sewer 75 is connected through by-passes 76 and 77 with the delivery side of the pump 66 and the sediment trap 65 respectively. There is also a by-pass 78 from the pipe 69 to the common suction pipe 64. Valves are provided in the connections as follows: In the pipes 62, 64, 67, 69, 74, 76, 77 and 78, respectively valves 62', 64', 67', 69', 74', 76', 77', and 78', the purpose of which will shortly appear.

The pump will be run whenever the condition of the tank requires it. When the pump is not running the supply pipe 71 delivers water to the tank automatically by pipe 69, filter 63, pipe 62 and pipe 55, valves 69' and 74' being closed.

When the pump is running in the normal operation of the system, valves 64', 67', 69' and 62' are open and the valves in the various by-passes are all closed. Water is then drawn into the suction pipes 57 and by pipes 61, 64, trap 65, connection 67 to the pump 66 whence it is forced through pipe 69, filter 63, pipe 62, and return pipe 55 into the tank flushing the bottom as already explained. Fresh water is automatically furnished by this supply pipe 71 whether or not the pump is working.

The by-pass 77 permits sediment to be delivered directly from the trap 65 to the sewer 75, and the by-pass 76 from the pump to the sewer, valves 69' and 78' being closed in the latter case.

The by-passes 74 and 78, when their valves 74' and 78' are open and valves 62', 64', 67', 69' and the other by-pass valves are closed, make it possible to reverse the course of the water to clean out the suction pipes and their slots, water being drawn in at the center line of the bottom of the tank to pipe 55, and thence by pipe 62, by-pass 74, to the pump 66, whence, by pipe 69, by-pass 78, common suction pipe 64, pipes 61, it passes to the gutter suction pipes 57.

It will be understood that this system including the by-pass features described may be used with the shallow tank arrangement either with the delivery devices to the molds, or as a separate system for keeping the tank free from heavy sediment, other circulatory devices being employed to assist in preventing the formation of impure cores. The circulation might be upward through the molds, but the arrangement described is preferred.

The expression "open at the top" applied to the molds is not meant to imply that they may not have removable covers.

While it is a very great advantage to connect the individual freezing and thawing means for individual molds to the supply and return headers in parallel, series arrangements, though undesirable, might be used.

The provision of thawing pockets in the bottoms of the molds and their location above the top of the tank is a valuable feature of the invention. As already suggested the construction is such as to make the molds and most of the service pipes accessible from outside of the tank.

What I claim as my invention is:

1. Ice making apparatus comprising in combination, upright molds open at the top, a common water supply in communication therewith to automatically fill the same to a predetermined level below their tops, said molds extending outside said water supply, freezing and thawing means for said molds, and means for automatically controlling said common water supply.

2. Ice making apparatus comprising in combination, a water tank, a plurality of molds located in the atmosphere outside said tank open at the top and in communication therewith at their bottoms, a reservoir in communication with said tank and determining by its water level the water level in the molds, and means for freezing and thawing the contents of the molds.

3. Ice making apparatus comprising in combination, a water tank, molds located in the atmosphere outside said tank but in communication therewith and having their water level determined by that of the tank, means for freezing and thawing the contents of the molds, an automatically controlled water supply for said tank to maintain a predetermined water level therein, and piping outside said tank for serving said freezing and thawing means.

4. Ice making apparatus comprising in combination, a water tank, molds outside said tank but in communication therewith and having their water level determined by that of the tank, individual freezing and thawing means surrounding each mold, and piping outside said tank for serving said freezing and thawing means.

5. Ice making apparatus comprising in combination, a water tank, a plurality of upright molds on top of said tank in communication therewith at their bottoms, and having a water tight connection with the top thereof, said molds having warm air pockets in their bottoms above the top of the tank, and means for delivering warm air to said pockets.

6. Ice making apparatus comprising in combination, a shallow tank, a plurality of molds located on top of said tank and in communication at their bottoms therewith, means for freezing and thawing the contents of the molds, and means for automatically maintaining the water level in said molds above the top of the tank.

7. Ice making apparatus comprising in combination, a water tank having a closed top, an extension above said top constituting a reservoir, a plurality of molds in communication at their bottoms with the tank extending up above the top thereof and having their water level determined by the water level in the extension of the tank, automatic means for feeding water to said reservoir to a predetermined level, and means for freezing and thawing the contents of said molds.

8. Ice making apparatus comprising in combination, a water tank having a closed top, an extension above said top constituting a reservoir, a plurality of molds in communication at their bottoms with the tank extending up above the top thereof and having their water level determined by the water level in the extension of the tank, freezing and thawing jackets surrounding individual molds, and piping outside said tank for serving said jackets.

9. Ice making apparatus comprising in combination, a water tank, a plurality of upright molds in communication at their bottoms with the tank and having water-tight connections with the top thereof, individual freezing and thawing means for said molds, piping for serving said freezing and thawing means located above the top of the tank and below the tops of the molds, and a reservoir in communication with the tank determining by its water level the water level in the molds.

10. Ice making apparatus comprising in combination, a water tank having a closed top, a plurality of upright molds located thereon and in communication therewith at their bottoms, said tank having a head of water sufficient to fill said molds to a level above the top of the tank, means for freezing and thawing the contents of said molds, and piping and connections above the tank beside the molds for serving said freezing and thawing means.

11. Ice making apparatus comprising in combination, a shallow water tank having a closed top, a plurality of rows of molds thereon and in communication therewith at their bottoms, freezing and thawing means for said molds, piping and connections outside said tank and below the tops of the molds for serving said means, and a jet line above the top of the tank for delivering fluid under pressure at the bottom of the molds.

12. Ice making apparatus comprising in combination, a shallow water tank having a closed top, a plurality of upright molds mounted on the top of said tank open at the top and having a water tight connection with the top of the tank, said molds having transverse bottoms located above the top of the tank and provided with holes whereby they are in communication with the tank and having depending shells surrounding the holes in their bottoms and forming a space between the bottom of the mold and the top of the tank, means for freezing and thawing the contents of the molds, and means for delivering thawing fluid to the said spaces.

13. Ice making apparatus comprising in combination, a shallow water tank, molds located in the atmosphere on top of said tank in communication at their bottoms with said tank to be automatically filled therefrom and having a water tight connection with the top of the tank, a reservoir in communication with said shallow tank and determining the level of the water in the molds, means for freezing and thawing the contents of the molds, and automatic means for feeding water to said reservoir to a predetermined level.

14. Ice making apparatus comprising in combination, a shallow water tank having a closed top, molds located in the atmosphere on top of said tank having a water tight connection with the top of the tank and having transverse bottoms above the top of the tank provided with holes whereby they are in communication with the tank to be automatically filled therefrom, a reservoir in communication with said shallow tank and determining the level of the water in the molds, means for freezing and thawing the contents of the molds, and means for applying thawing fluid to the under side of said transverse bottoms.

15. Ice making apparatus comprising in combination, a shallow water tank having a closed top, molds located in the atmosphere on top of said tank having a water tight connection with the top of the tank and having transverse bottoms above the top of the tank provided with holes whereby they are in communication with the tank to be automatically filled therefrom, a reservoir in communication with said shallow tank and determining the level of the water in the molds, means for freezing and thawing the contents of the molds, said molds having an auxiliary thawing chamber between the bottom of the mold and the top of the tank, a separate supply line for thawing fluid, and means for delivering thawing fluid from said supply line to the said auxiliary thawing chambers.

16. Ice making apparatus comprising in combination, a shallow water tank having a closed top, molds located in the atmosphere on top of said tank having a water tight connection with the top of the tank and having transverse bottoms above the top of the tank provided with holes whereby they are in communication with the tank to be automatically filled therefrom, a reservoir in communication with said shallow tank and determining the level of the water in the molds, shells depending from the bottoms and surrounding said holes and forming open bottomed air trapping spaces beneath the bottoms of the molds, means for freezing and thawing the contents of said molds, an air line located in the atmosphere above the top of the tank, and devices for delivering air therefrom to the said spaces beneath the bottoms of the molds.

17. Ice making apparatus comprising in combination, a shallow water tank having a closed top, molds located in the atmosphere on top of said tank having a water tight connection with the top of the tank and having transverse bottoms above the top of the tank provided with holes whereby they are in communication with the tank to be automatically filled therefrom, a reservoir in communication with said shallow tank and determining the level of the water in the molds, shells depending from the bottoms and surrounding said holes and forming open bottom air trapping spaces beneath the bottoms of the molds, means for freezing and thawing the contents of said molds, an air line located in the atmosphere above the top of the tank, devices for delivering thawing fluid to the said spaces beneath the bottoms of the molds, and automatic means for feeding water to said reservoir to a predetermined level.

18. Ice making apparatus comprising in combination, a common water supply, a plurality of upright molds located in the atmosphere and in communication at their bottoms with said supply, said molds having warm air pockets in their bottoms, and means for delivering warm air to said pockets.

19. Ice making apparatus comprising in combination, a common water supply, a plurality of upright molds extending outside said water supply and in communication at their bottoms therewith, freezing and thawing means for said molds, said molds having transverse bottoms provided with holes and having shells surrounding said holes and walls surrounding said shells, said shells and walls having a water tight connection with said bottom and forming with the bottoms of the molds water sealed air trapping pockets beneath the molds and distinct from said freezing and thawing means, and means for delivering warm air to said pockets.

20. Ice making apparatus comprising in combination, a water tank, molds open at the top and in communication therewith, a water header, connections between the interiors of individual molds at the wall of the mold at substantially the water line and said header, a pump, a filter, and connections between said pump, filter, tank, and water header constituting a circulatory system.

21. Ice making apparatus comprising in combination, a water tank, molds in communication therewith, supply piping for delivering water to the interior of said molds adjacent their tops, suction piping adjacent the bottom of said tank, a pump having its delivery side connected to said supply piping, and a filter connected to said suction piping and to the suction side of said pump.

22. Ice making apparatus comprising in combination, a water tank having a closed top, an extension above said top constituting a reservoir, a plurality of molds in communication at their bottoms with the tank extending up above the top thereof and having their water level determined by the water level in the extension of the tank, and a circulatory system comprising a pump, a filter, a water header, connections between the interiors of individual molds adjacent their tops and said header, and a connection with the tank below the molds.

23. Ice making apparatus comprising in combination, a water tank, molds in combination therewith, water supply piping for delivering water to the interior of said molds adjacent their tops, a flushing water pipe adjacent the bottom of the tank, a pump having its delivery side connected to said water supply piping, a filter connected to said suction piping and to the inlet side of said pump, a by-pass leading from said water supply piping between said pump and the molds to the flushing pipe, and a valve in said by-pass.

24. Ice making apparatus comprising in combination, a tank, means for flushing the bottom of the tank, means for receiving sediment from the bottom of the tank, a filter, a pump and connections between the parts specified constituting a circulatory system to enable the pump to withdraw water and sediment from said tank, filter the same and return the water to the tank.

25. Ice making apparatus comprising in combination, a tank having a sloping bottom, a pipe having openings therein to deliver water to said slope to flush the same, a pipe adjacent the lower end of said slope to receive water and sediment, a filter, a pump, and connections between the receiving pipe and the filter, between the filter and the pump and between the pump and the delivery pipe, constituting a circulatory system.

26. Ice making apparatus comprising in combination, a tank having a bottom slanting in both directions from an intermediate portion, a water delivery pipe running along said portion and provided with means to deliver water under pressure adjacent both said slopes, a suction pipe at the foot of each slope and means comprising a pump, filter and connections to withdraw water and sediment from said tank through said suction pipes, to remove the sediment and return the water to the said delivery pipe and tank.

27. Ice making apparatus comprising in combination, a water tank, a delivery pipe to said tank, a suction pipe in said tank, a pump connected to both said pipes, a by-pass from the delivery side of the pump to the suction pipe, a by-pass from the inlet side of the pump to the delivery pipe, and valves controlling the system to reverse the course of the water at pleasure.

28. Ice making apparatus comprising in combination, a tank, a water delivery pipe adjacent the bottom of the tank, a suction pipe adjacent the bottom of the tank, a pump, connections between the suction side of the pump and said suction pipe and between the delivery side of the pump and said water delivery pipe, a filter in the connections between the delivery side of the pump and the water delivery pipe, a by-pass between the delivery side of the pump and the sewer and valves in said by-pass and connections.

29. Ice making apparatus comprising in combination, a water tank, a pipe adjacent the bottom of the tank for flushing the same, a suction pipe also adjacent the bottom of the tank, a sediment trap connected to said suction pipe, a pump, connections between the suction side of the pump and the sediment trap and between the delivery side of the pump and the flushing pipe, a by-pass between the trap and the sewer, and valves for controlling said connections and by-pass.

Signed by me at borough of Brooklyn, county of Kings, State of New York, this 29th day of June, 1910.

EDWARD T. WILLIAMS.

Witnesses:
HARRY T. BERNHARD,
JOHN WATT.